United States Patent
Hashimoto

(10) Patent No.: US 6,850,035 B2
(45) Date of Patent: Feb. 1, 2005

(54) CONTROL SYSTEM AND METHOD FOR BATTERY CONTROL UNIT

(75) Inventor: Eiichiro Hashimoto, Kyoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/380,163

(22) PCT Filed: Sep. 5, 2001

(86) PCT No.: PCT/JP01/07713
§ 371 (c)(1),
(2), (4) Date: Mar. 18, 2003

(87) PCT Pub. No.: WO02/24486
PCT Pub. Date: Mar. 28, 2002

(65) Prior Publication Data
US 2004/0027091 A1 Feb. 12, 2004

(51) Int. Cl.[7] .................................................. H02J 7/00
(52) U.S. Cl. ..................................................... 320/104
(58) Field of Search ................................. 320/104, 106, 320/112, 132, 131; 307/10.1, 77; 702/63

(56) References Cited

U.S. PATENT DOCUMENTS

| | | | | |
|---|---|---|---|---|
| 4,628,235 A | * | 12/1986 | Goings | 318/430 |
| 5,511,000 A | * | 4/1996 | Kaloi et al. | 704/201 |
| 5,619,417 A | * | 4/1997 | Kendall | 702/63 |
| 5,694,019 A | * | 12/1997 | Uchida et al. | 320/106 |
| 5,732,074 A | * | 3/1998 | Spaur et al. | 370/313 |
| 5,739,670 A | * | 4/1998 | Brost et al. | 320/131 |
| 5,834,132 A | | 11/1998 | Hasegawa et al. | 429/62 |
| 6,046,514 A | * | 4/2000 | Rouillard et al. | 307/77 |
| 6,064,180 A | * | 5/2000 | Sullivan et al. | 320/132 |
| 6,232,743 B1 | * | 5/2001 | Nakanishi | 320/104 |
| 6,307,349 B1 | * | 10/2001 | Koenck et al. | 320/112 |

FOREIGN PATENT DOCUMENTS

| | | |
|---|---|---|
| EP | 902520 A2 | 3/1999 |
| JP | 63-77304 A | 4/1988 |
| JP | 10-108379 A | 4/1998 |
| JP | 11-51818 A | 2/1999 |
| JP | 2000-173675 | 6/2000 |

* cited by examiner

Primary Examiner—Pia Tibbits
(74) Attorney, Agent, or Firm—Westerman, Hattori, Daniels & Adrian, LLP

(57) ABSTRACT

A BCU control system (10) includes a BCU (14) that calculates various kinds of measured data based on battery states such as a temperature, voltage, current, etc., of an automobile battery (12) so as to control actuators such as fans (18A, 18B), a relay (12C), etc., and a computer (16) connected to the BCU by a communication line, thereby enabling to carry out a data communication. A data collection command and an actuator control command are transmitted from the computer (16) to the BCU (14), and the computer collects various kinds of data from the battery and the BCU so as to carry out processes such as a data display, a data analysis, etc., and control the BCU.

12 Claims, 7 Drawing Sheets

CONTROL SYSTEM AND METHOD FOR BATTERY CONTROL UNIT

TECHNICAL FIELD

The present invention relates to a control system of a battery control unit (BCU) and a method thereof. The present invention relates to a BCU control system and a method thereof used for carrying out various kinds of capability tests, endurance tests, etc., of an automobile battery provided as a power source of an electric car so as to supply a running motor with driving currents.

PRIOR ART

In the prior art, various kinds of measured data of an automobile battery serving as a power source of an electric vehicle (EV) and a hybrid electric vehicle (HEV) were saved into a recording apparatus (memory) of a battery control unit (hereinafter referred to as "BCU"), and after completing a measuring process, various kinds of measured data saved in the recording apparatus are analyzed using a personal computer (hereinafter referred to as "computer") connected to the BCU by a communication line. A survival of capacity (SOC) of the battery is calculated so as to determine a charging and discharging state, for example.

However, it is quite inefficient to collect into the computer via the communication line the various kinds of measured data of the battery saved in the recording apparatus of the BCU after once completing the measuring process as described above so as to carry out the analysis. This process is not only time-consuming, but also there arises a problem that no prompt action can be taken where warning information and trouble information occur.

Regarding the transmission between the computer and the BCU, the computer transmits a data transmission command to the BCU at every time that the data is needed, and receives the data responding to the command from the BCU. This results in a problem that a transmission/reception amount for collecting the data becomes large, and as a consequent, charges on the computer and the BCU also become large.

Furthermore, in a case that battery information to be detected, e.g. the number of items to be detected such as voltage, a temperature, etc. is different, there is troublesomeness that a data-collection program is to be customized. This is a problem for those who lack in program knowledge because it is difficult to apply maintenance thereto.

SUMMARY OF THE INVENTION

Therefore, it is a primary object of the present invention to provide a novel BCU control system.

It is another object of the present invention to provide a BCU control system capable of comprehending a state of a BCU and/or a battery in a real time manner.

It is yet another object of the present invention to provide a BCU control system that does not apply an excessive transmission/reception charge to a computer and/or a BCU.

It is yet still another object of the present invention to provide a BCU control system capable of easily corresponding to different requirements.

A BCU control system according to the present invention, comprises: an automobile battery; a BCU for controlling an actuator based on a state of the automobile battery; and a computer connected to the BCU by a communication means in a manner capable of performing a data communication therebetween, and a data collection command and an actuator control command being sent from the computer to the BCU.

The data collection command is transmitted from the computer to the BCU that controls the actuator based on a state of the automobile battery, enabling the computer to display, record, and analyze the data based on the state of the battery in a real time manner. In addition, the actuator control command is transmitted from the computer to the BCU, thereby automatically controlling the actuator such as a fan, a relay, and so on, for example.

Furthermore, the data collection command transmitted from the computer to the BCU has been divided into three portions, i.e. a data selection command, a data transmission start command, and a data transmission stop command, enabling the computer to collect the necessary data whenever needed simply by transmitting to the BCU the selection command, the transmission start command, and the transmission stop command. In addition, it is not needed to transmit another command from the computer to the BCU in the course of receiving the data, thus reducing transmission/reception charges of the computer and the BCU.

Moreover, the data collection program of the computer is automatically set by using map files for different specifications of the battery, the number of items to be detected, and etc.

According to the present invention, since the data communication is performed between the BCU and the computer, it is possible to display and analyze the data in a real time manner, and to interactively control the BCU by transmitting the commands as required. As a result, it becomes possible to easily carry out a test and/or analysis of an operation, and a detection of trouble.

Furthermore, the data collection command from the computer toward the BCU is divided into three portions, e.g. a data selection, a data transmission start, and a data transmission stop, which eliminates a need to transmit the command from the computer to the BCU in the course of the data collection. This enables to reduce a transmission/reception amount between the two, thus resulting in a high-speed communication.

In addition, a map file different in specification or requirement is read into the computer so that a data collection program is automatically set, thus an easy maintenance.

According to one aspect of the present invention, a control method of a battery control unit (BCU) for controlling an actuator based on a state of an automobile battery, comprises following steps of: (a) transmitting a data transmission command to the BCU; (b) receiving data from the BCU; (c) storing the data into a buffer; and (d) reading the data from the buffer so as to execute at lease one of a data analysis, a data display, and a graph drawing.

According to another aspect of the present invention, a control method of a battery control unit (BCU) for controlling an actuator based on a state of an automobile battery, comprises following steps of: (a) transmitting an actuator control command to the BCU; (b) receiving data showing a state of the actuator from the BCU; and (c) displaying a state of the actuator according to the data.

In this aspect, a control method, further comprises following steps of: (d) determining whether or not the actuator is properly controlled based on the data; and (e) performing an error display when the actuator is not properly controlled.

The above described objects and other objects, features, aspects and advantages of the present invention will become

BEST MODE FOR PRACTICING THE INVENTION

Figure 1:
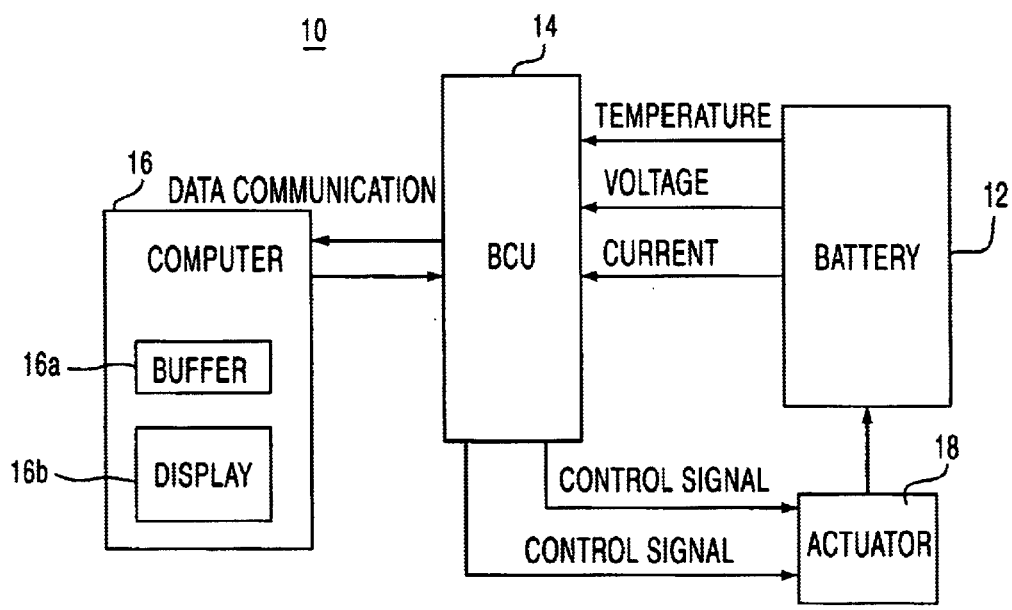
FIG. 1 is one embodiment of the present invention, showing a schematic structural view for describing a BCU control system.
Figure 2:
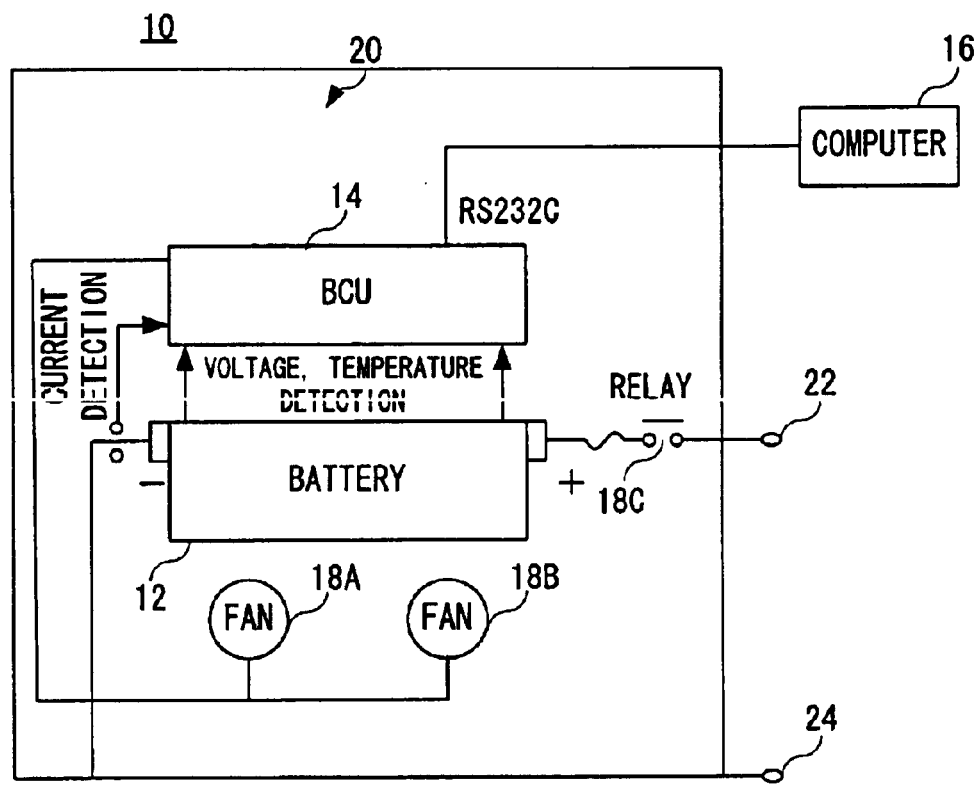
FIG. 2 is a schematic block diagram of a battery system portion in FIG. 1.
Figure 3:
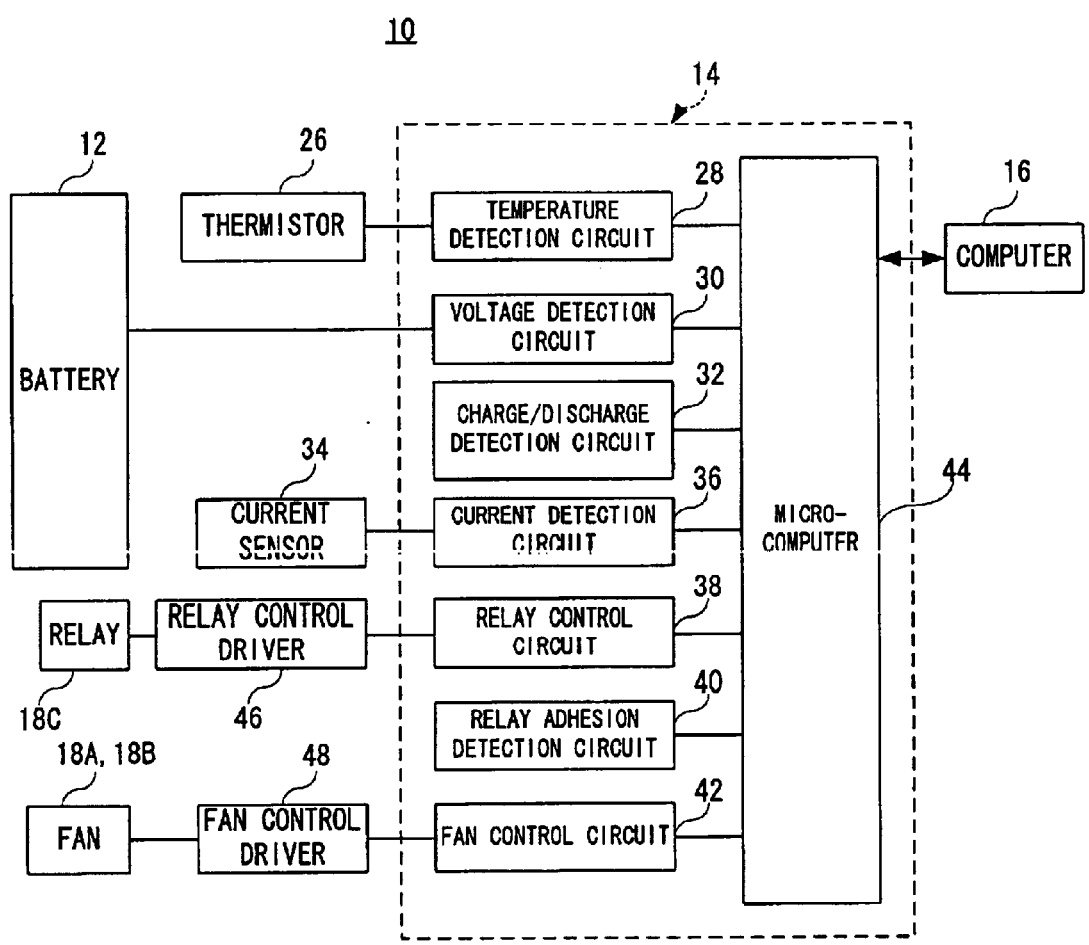
FIG. 3 is a circuit block diagram showing the BCU control system of the embodiment of the present invention.

A BCU control system 10, which is one embodiment of the present invention, shown in FIG. 1–FIG. 3 includes an automobile battery 12 constructed as a result of a plurality of battery cells being connected in series, a BCU 14 that calculates various measured data, such as a survival of capacity (SOC), for example, by receiving inputs, e.g. a temperature, voltage, current, etc., of the battery 12, a computer 16 connected to the BCU 14 by a communication line in a manner capable of performing a data communication therebetween, and an actuator 18 such as a relay, a fan, and so on that protects the automobile battery 12 by being controlled by a control signal from the BCU 14.

FIG. 2 is a schematic block diagram of a battery system portion 20, and the battery system portion 20 includes the automobile battery 12, the BCU 14 that calculates various kinds of measured data by detecting the voltage, the temperature, and the current of the battery 12, and fans 18A, 18B, and a relay 18C controlled by signals from the BCU 14.

Furthermore, between a positive electrode lead terminal 22 and a negative electrode lead terminal 24 of the automobile battery 12, a running motor (not shown) is connected via an inverter that converts a direct current (DC) into an alternate current (AC). In addition, the BCU 14 is connected to the computer 16 via a communication line RS232C, thereby rendering possible a data communication.

FIG. 3 is a circuit block diagram showing entire structure of the BCU control system.

In FIG. 3, the BCU 14 includes a temperature detection circuit 28 using a thermistor 26, a voltage detection circuit 30 of the battery 12, an electric leakage detection circuit 32, a current detection circuit 36 using a current sensor 34, a relay control circuit 38, a relay adhesion detection circuit 40, a fan control circuit 42, and a microcomputer 44 that calculates various kinds of measured data and control data based on input signals from these circuits. In addition, the respective data calculated by the microcomputer 44 are sent by a data communication using a communication line to the computer 16. It is noted that the microcomputer 44 includes a CPU, a ROM, a RAM, etc., for performing required control processes.

Moreover, the relay control circuit 38 and the fan control circuit 42 control the relay 18C, and the fans 18A and 18B, respectively, via a relay control driver 46 and a fan control driver 48 by control signals from the microcomputer 44. It is noted that an operation power of the BCU 14, the computer 16, and respective circuits, the drivers, etc., is not illustrated.

Figure 4:
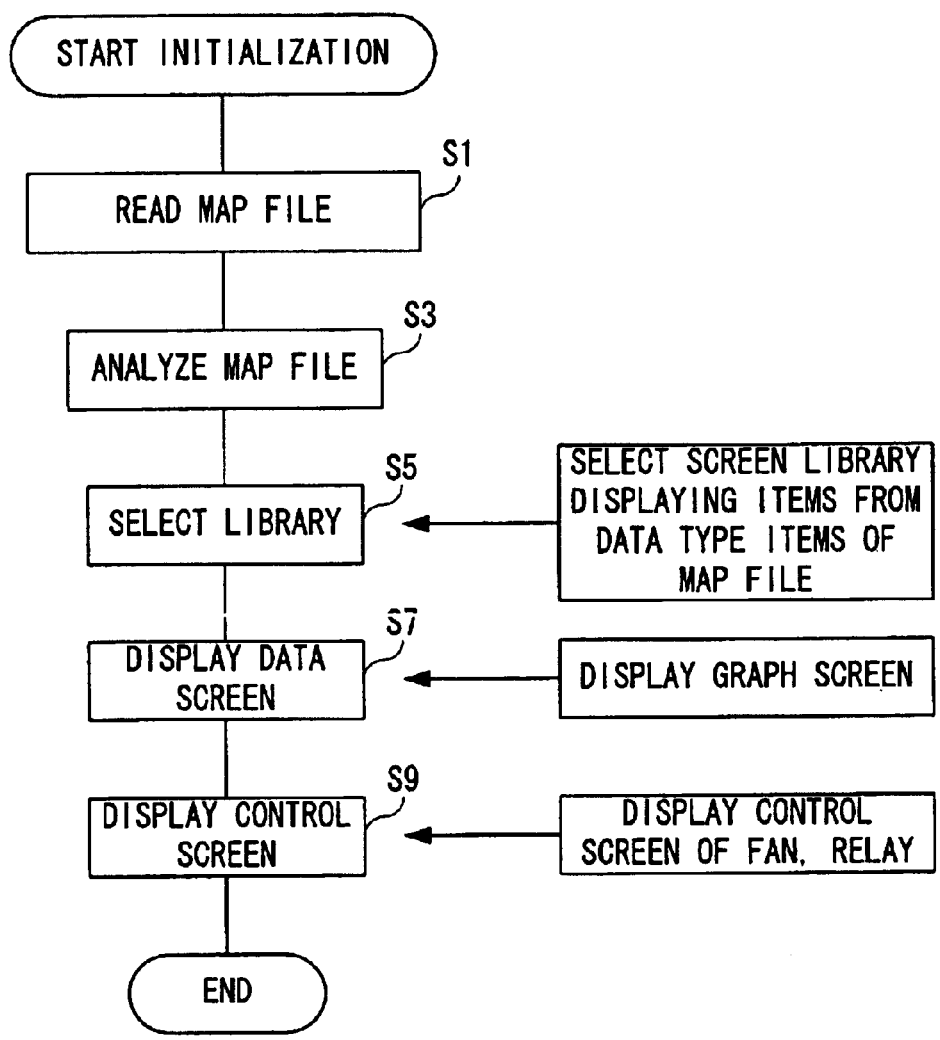
FIG. 4 is an operational flowchart showing a procedure for carrying out an initialization process by reading into a computer of FIG. 3 a data collection-use program.

FIG. 4 is a flowchart of an operation for performing an initialization process of the computer 16 for the data collection program in the embodiment of the present invention.

That is, map files in which the number of items to be detected of the temperature, the voltage, etc., of the battery, and the control information for the fans, the relay, etc., are filed for each of batteries having different specifications, e.g. a battery A and a battery B, for example, are read into the RAM of the computer 16 so that the number of items to be detected and a control method are automatically set.

In FIG. 4, the map file is read into the RAM of the computer 16 in a step S1, and in a step S3, the map file is analyzed by the CPU before selecting a library in a step S5. That is, a screen library by which items are displayed from data type items of the map file is selected.

Then, in a step S7, a data screen display is set as a display of a graph screen, and furthermore, in a step S9, a control screen display is set as a display of a control screen of the relay, thereby to complete the initialization process of the data collection program for the computer 16.

Furthermore, it is thus possible to automatically set the number of the data collecting places for a battery box different in format, making it possible to flexibly respond to the number of items of the battery to be detected, etc., without a compile of the data collection program. As a result, this enables even those not knowledgeable in programming to carry out a maintenance.

Next, based on a flowchart shown in FIG. 5, a data communication between the BCU 14 and the computer 16 and a data processing operation will be described.

In the present invention, in order to enhance a high-speed data communication capability, a data collection command from the computer 16 toward the BCU 14 is divided into three, e.g. a data selection command, a data transmission start command, and a data transmission stop command.

Figure 5:
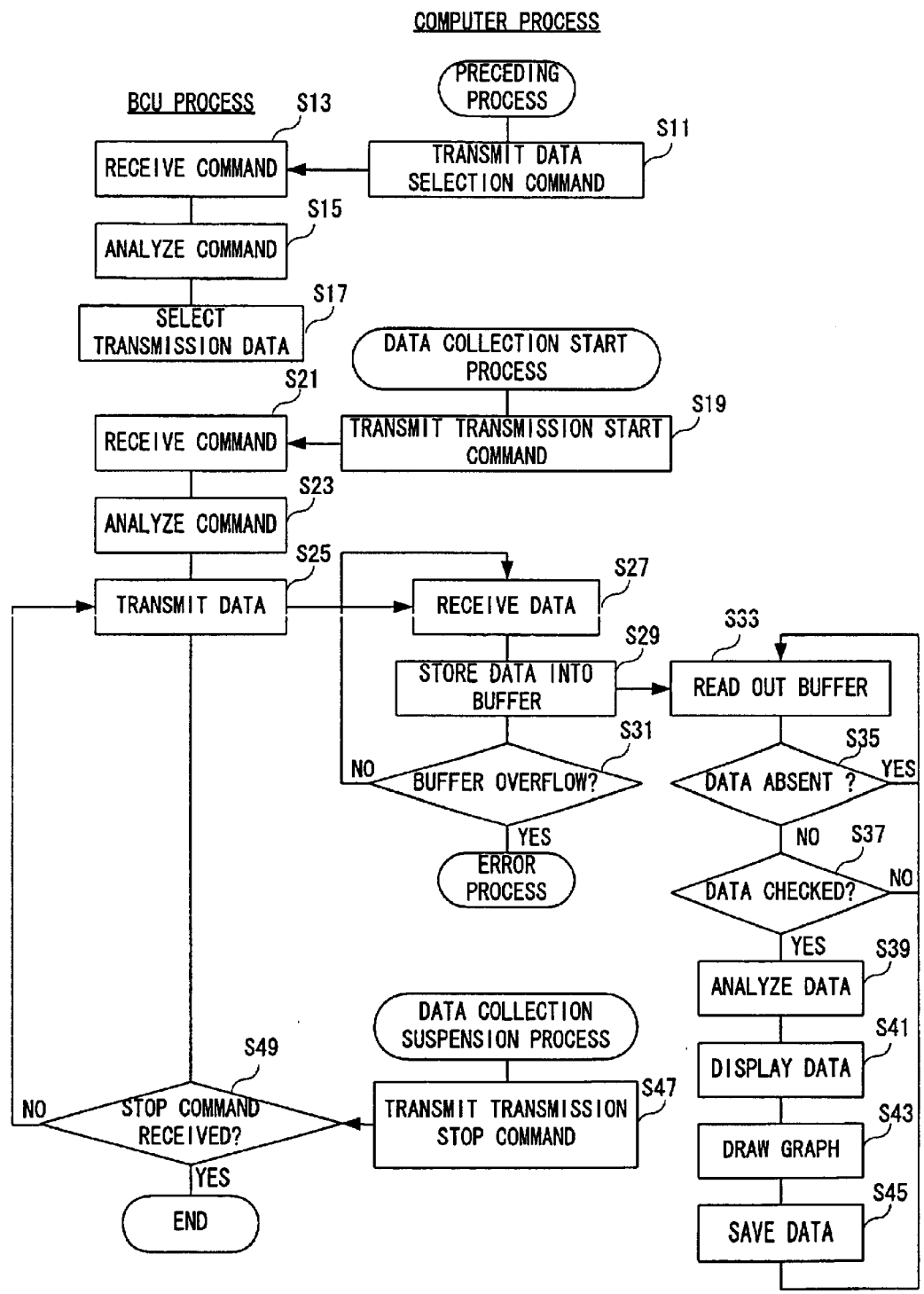
FIG. 5 is a flowchart showing a data communication operation between the BCU and the computer in FIG. 3 and a data processing operation.

In FIG. 5, as a preceding process, the data selection command is transmitted from the computer 16 to the BCU 14 in a step S11. On a BCU side, the command is received in a step S13, and the received command is analyzed in a step S15, and then, the transmission data is selected in a step S17.

Next, as a data collection start process, the data transmission start command is transmitted from the computer 16 to the BCU 14 in a step S19. The BCU 14 receives the command in a step S21, and analyzes the command in a step S23 before continuing transmitting the data in the step S25 until the data transmission stop command is received in a step S49 after transmitting the data in a step S25.

On the other hand, the computer 16 receives the data in a step S27, stores the data into a buffer 16a (memory) of the computer 16 in a step S29. Furthermore, it is determined whether or not the buffer 16a is overflowed in a step S31. If the result is "YES", an error process is carried out, and if "NO", the process returns to the step S27 so as to continue receiving the data.

Then, the data stored in the buffer in the step S29 is read out in a step S33, and whether or not the data is present or absent is confirmed in a step S35. If the result is "YES", that is, the data is not present, the process returns to the step S33, and if "NO", that is, the data is present, the process advances to a step S37.

It is determined whether or not the data check has been performed in the step S37. If "NO", that is, the data has not been checked, the process returns to the step S33, and if "YES", that is, the data has been checked, the data is analyzed in a step S39, the data is displayed on a display 16b of the computer 16 in a step S41, the data is illustrated as a graph in a step S43, and furthermore, the data is saved into the memory in a step S45, and then, the process returns to the step S33.

Finally, as a data collection suspension process, the data transmission stop command is transmitted from the computer 16 to the BCU 14 in a step S47, and it is confirmed whether or not the data transmission stop command is received in a step S49. If "YES", a series of the data receiving operations are ended, and if "NO" in the step S49, the process returns to the step S25 so as to transmit the data from the BCU 14 to the computer 16.

Figure 6:
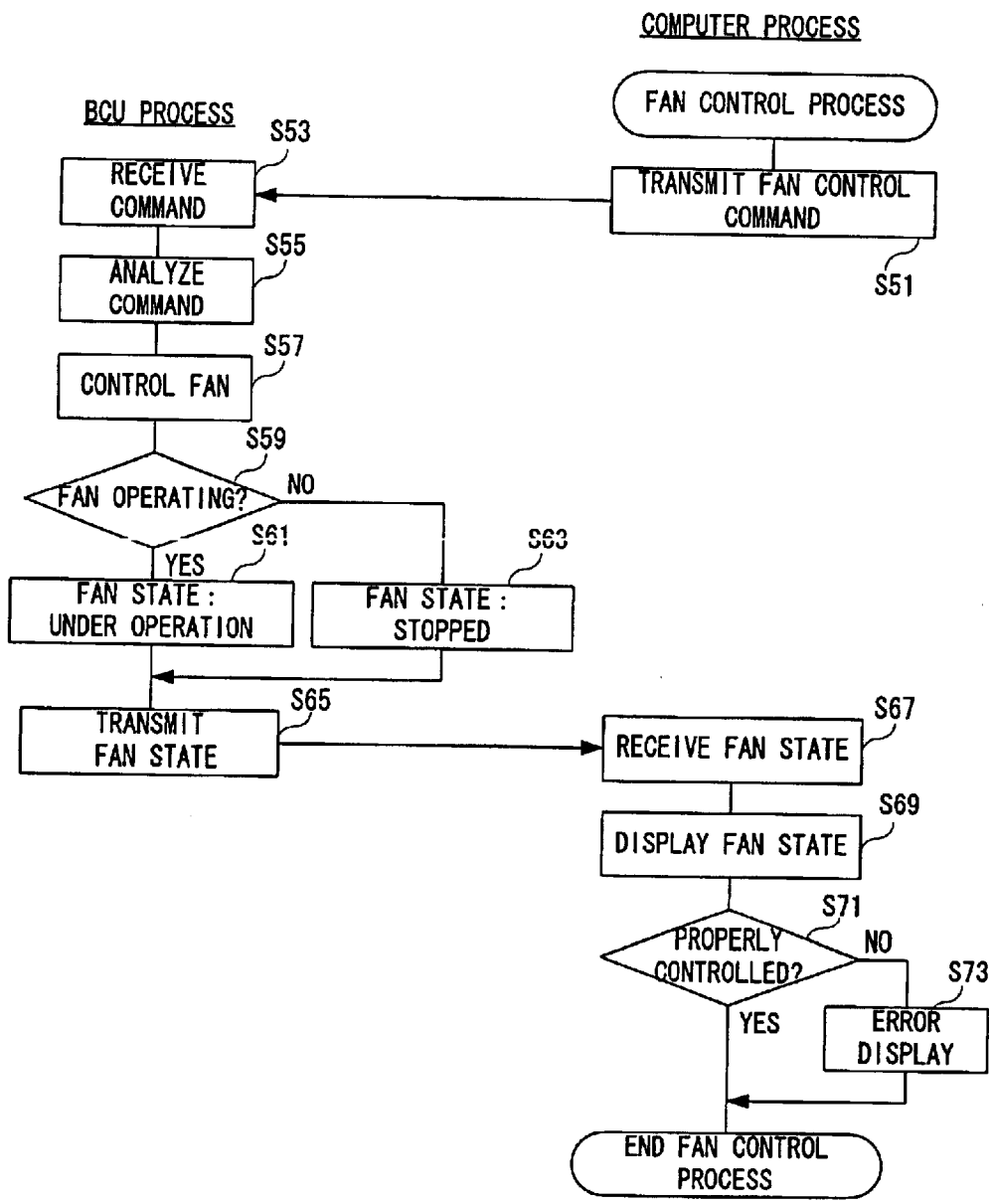
FIG. 6 is a fan control flowchart showing a control of the fan in FIG. 3.
Figure 7:
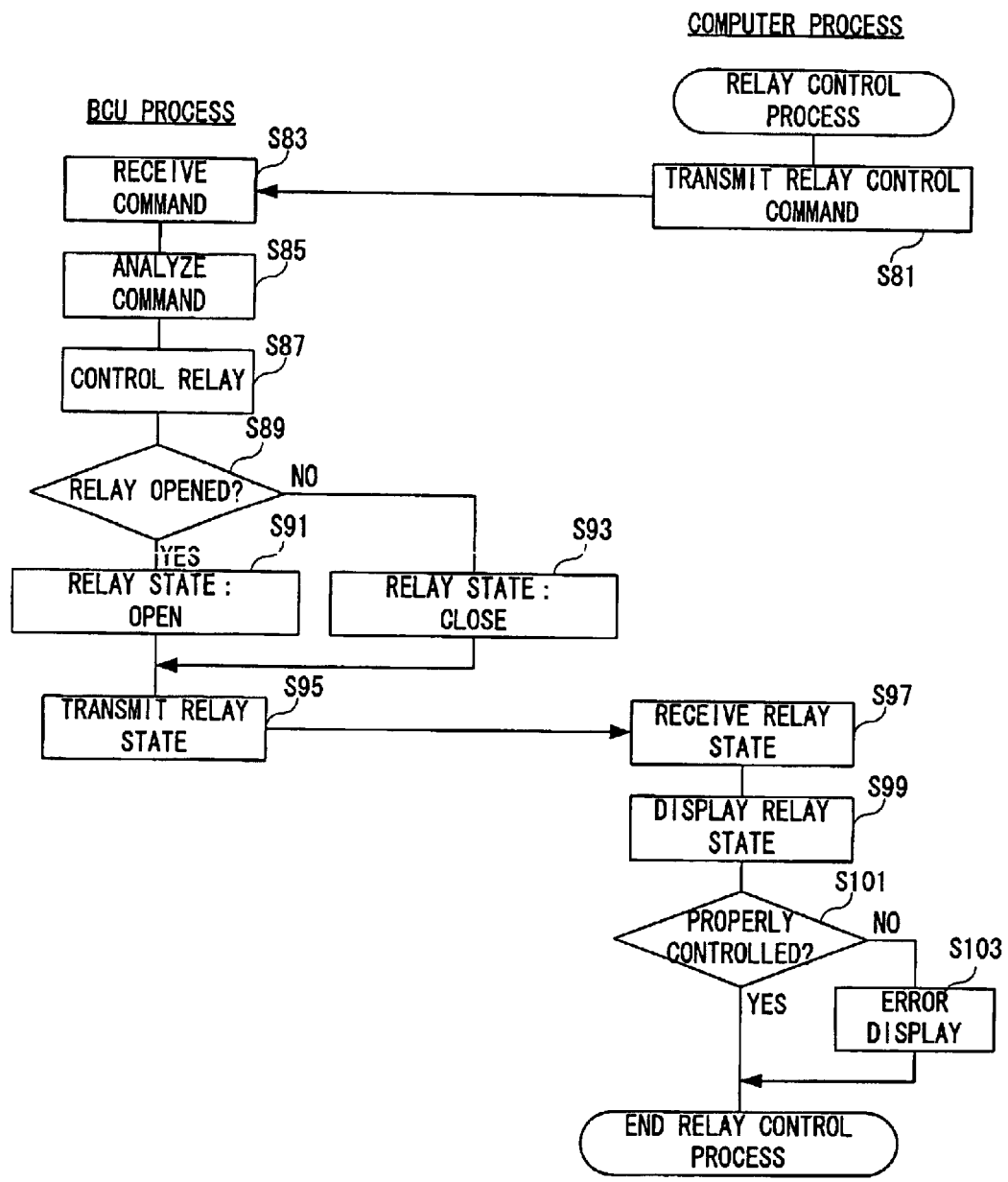
FIG. 7 is a relay control flowchart showing a relay control in FIG. 3.

In FIG. 6 and FIG. 7, a relay control and a fan control for the automobile battery 12 based on the data receiving method described in FIG. 5 are performed, respectively.

It is noted that an operation flow of the fan control shown in FIG. 6 and an operation flow of the relay control shown in FIG. 7 are essentially the same, and therefore, only the operation flow of the fan control will be herein described, and a description of the operation flow of the relay control is omitted. It is noted that step numbers of S51–S73 in FIG. 6 correspond to step numbers S81–S103 in FIG. 7, respectively.

In FIG. 6, the data selection command as a preceding process has already been transmitted from the computer 16 to the BCU 14, which completes the selection of the transmission data.

In a case of performing the fan control by the computer 16, if the fan control command is transmitted in a step S51, the BCU 14 receives the command in a step S53, analyzes the command in a step S55, and collects the data regarding the fan control in a step S57 so as to determine whether or not the fan is being operated in a step S59. If the result is "YES", the process determines that the fan is being operated in a step S61, and if "NO", that the fan is being stopped in a step S63. Then, the respective conditions or states of the fans are transmitted to the computer 16 in a step S65.

On the other hand, the computer 16 receives the state of the fan in a step S67, and displays the state on the display screen 16b in a step S69. Then, it is determined whether or not the fan is appropriately controlled in a step S71, and if the result is "YES", the fan control process is ended. If the determination result in the step S71 is "NO", the error display is performed in a step S73, which ends a series of the fan control processes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control system of a battery control unit (BCU), comprising:
    an automobile battery;
    a BCU for controlling an actuator based on a state of said battery; and
    a computer connected to said BCU by a communication means in a manner capable of performing a data communication therebetween, wherein
    a data collection command and an actuator control command ie are sent from said computer to said BCU.

2. A control system according to claim 1, wherein said actuator includes a fan for said battery.

3. A control system according to claim 2, wherein
    said actuator control command includes a fan control command,
    said BCU transmits to said computer data showing a state of said fan in response to a reception of said fan control command, and
    said computer displays a state of said fan based on said data.

4. A control system according to claim 1, wherein said actuator includes a relay for said battery.

5. A control system according to claim 4, wherein
    said actuator control command includes a relay control command,
    said BCU transmits to said computer data showing a state of said relay in response to a reception of said relay control command, and
    said computer displays a state of said relay based on said data.

6. A control system according to claim 1, wherein said data collection command includes a data selection command, a data transmission start command, and a data transmission stop command.

7. A control system according to claim 6, wherein said BCU transmits to said computer state data showing a state of said battery in response to said data collection command.

8. A control system according to claim 7, wherein said state of said battery includes at least a current, a temperature, and a voltage of said battery.

9. A control system according to any one of claims 1 to 8, further comprising a map file for automatically setting a data collection program for said computer.

10. A control method of a battery control unit (BCU) which controls an actuator based on a state of an automobile battery, comprising following steps of:
    (a) transmitting a data transmission command to the BCU;
    (b) receiving data from the BCU;
    (c) storing the data into a buffer; and
    (d) reading the data from the buffer so as to execute at least one of a data analysis, a data display, and a graph drawing.

11. A control method of a battery control unit (BCU) which controls an actuator based on a state of an automobile battery, comprising following steps of:
    (a) transmitting an actuator control command to the BCU;
    (b) receiving data showing a state of the actuator from the BCU; and
    (c) displaying a state of the actuator according to the data.

12. A control method according to claim 11, further comprising steps of:
    (d) determining based on the data whether or not the actuator is properly controlled; and
    (e) performing an error display when the actuator is not properly controlled.

* * * * *